Jan. 20, 1925.

H. McL. ARMISTEAD 1,523,625

MACHINE FOR MAKING AND ATTACHING TYPEWRITER RIBBON CLIPS

Filed Dec. 27, 1922   10 Sheets-Sheet 1

Inventor.
Hubert McL. Armistead
By Booth & Booth,
Attorneys

Jan. 20, 1925. 1,523,625
H. McL. ARMISTEAD
MACHINE FOR MAKING AND ATTACHING TYPEWRITER RIBBON CLIPS
Filed Dec. 27, 1922 10 Sheets-Sheet 2
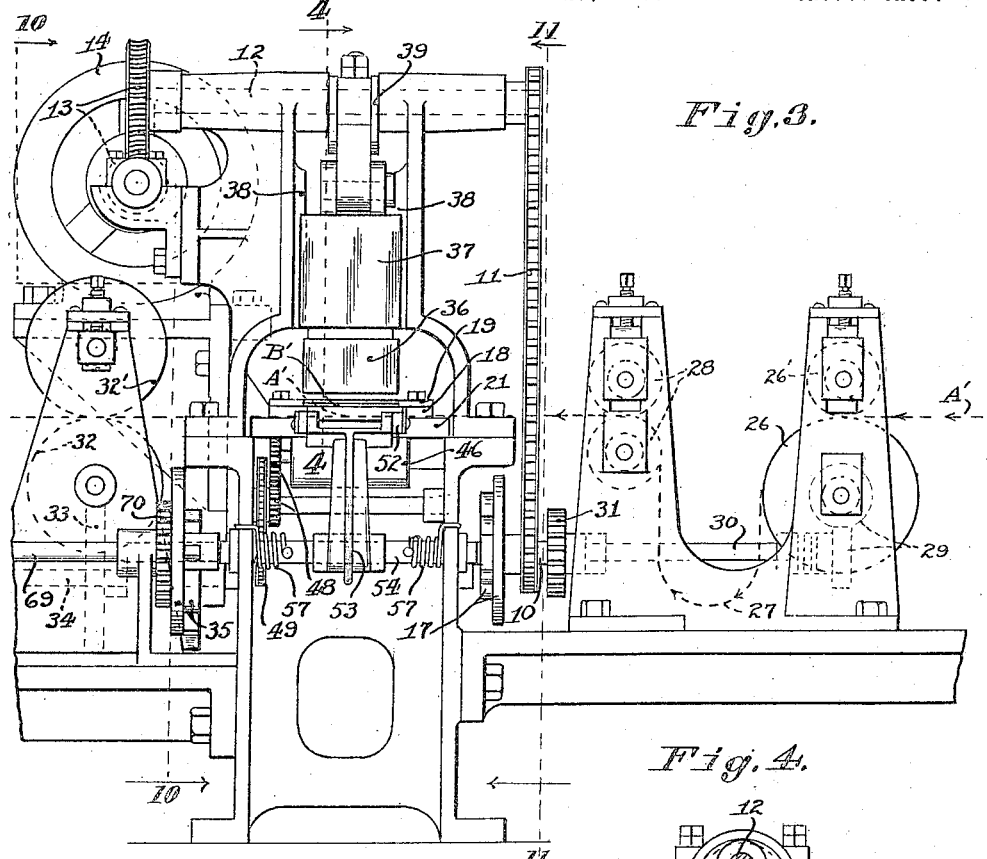
Fig. 3.
Fig. 4.
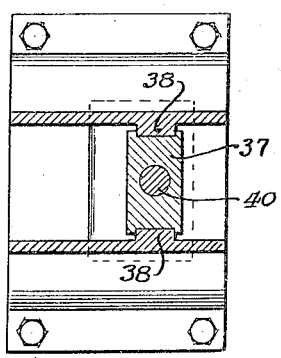
Fig. 5.
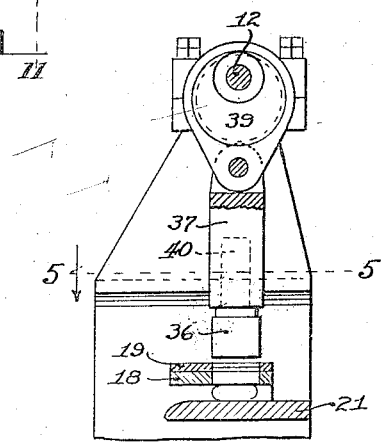
Inventor.
Hubert McL. Armistead
By Booth & Booth
Attorneys

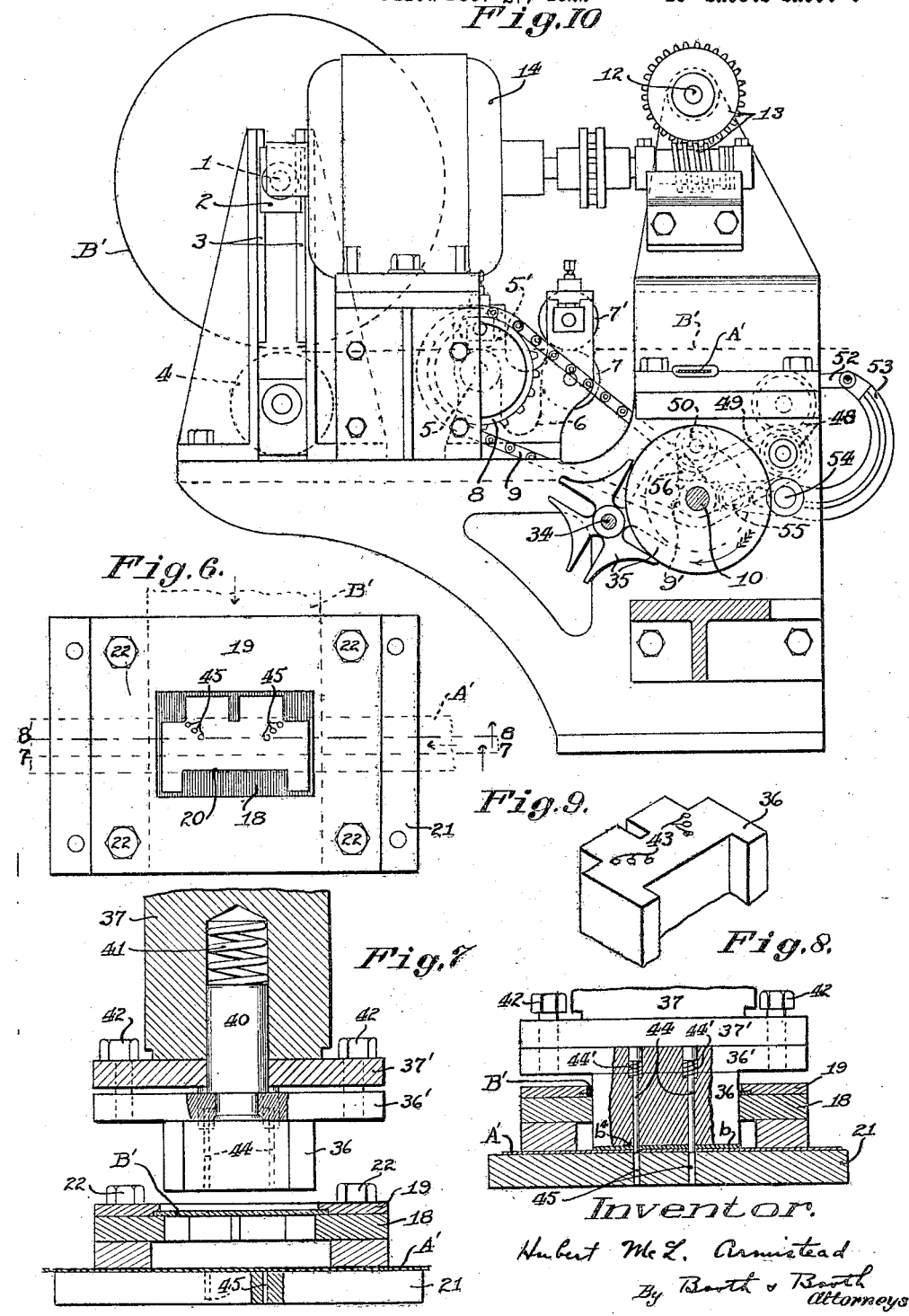

Jan. 20, 1925.

H. McL. ARMISTEAD 1,523,625

MACHINE FOR MAKING AND ATTACHING TYPEWRITER RIBBON CLIPS

Filed Dec. 27, 1922    10 Sheets-Sheet 4

Inventor.
Hubert McL. Armistead
By Booth & Booth
attorneys

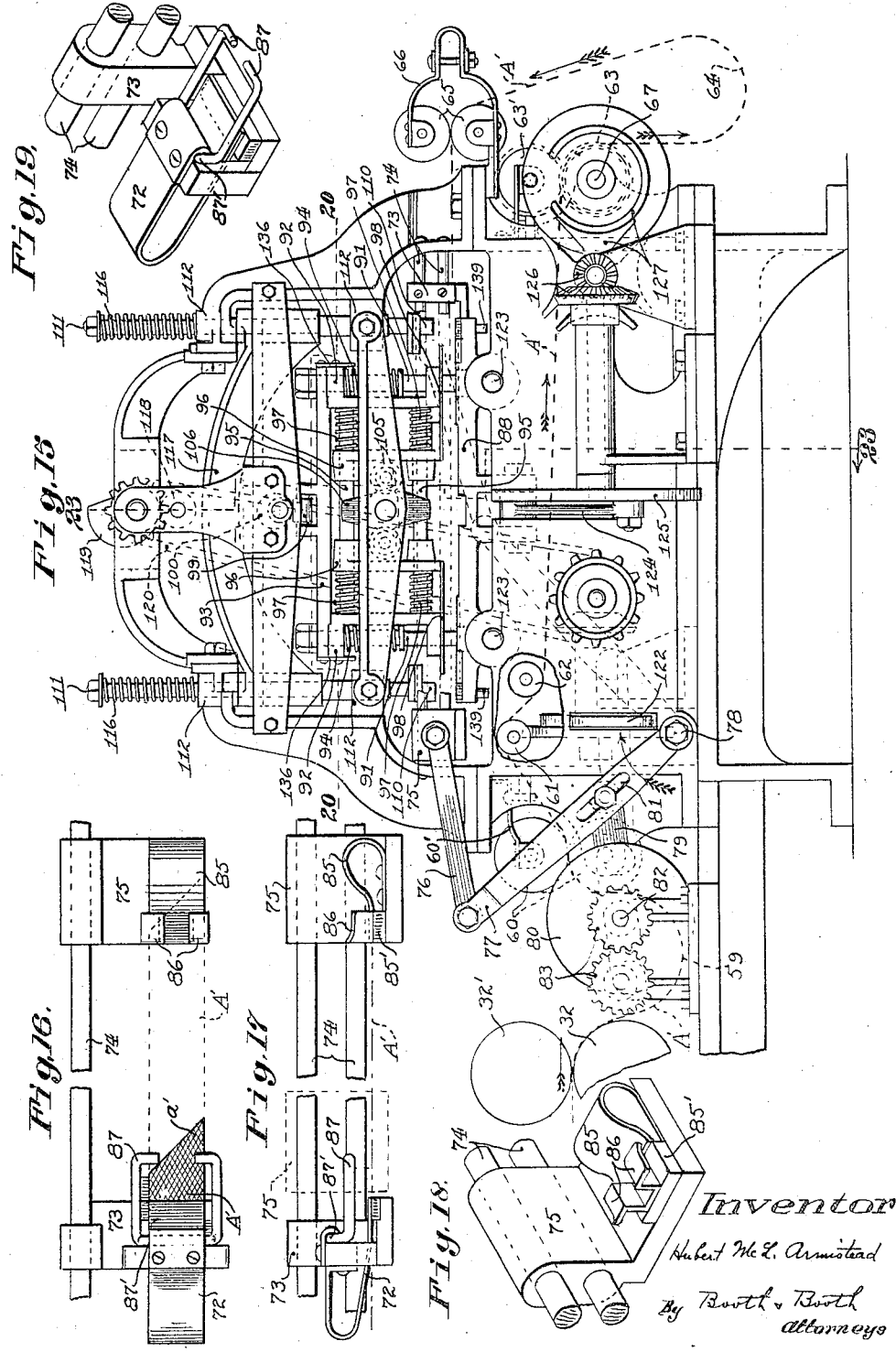

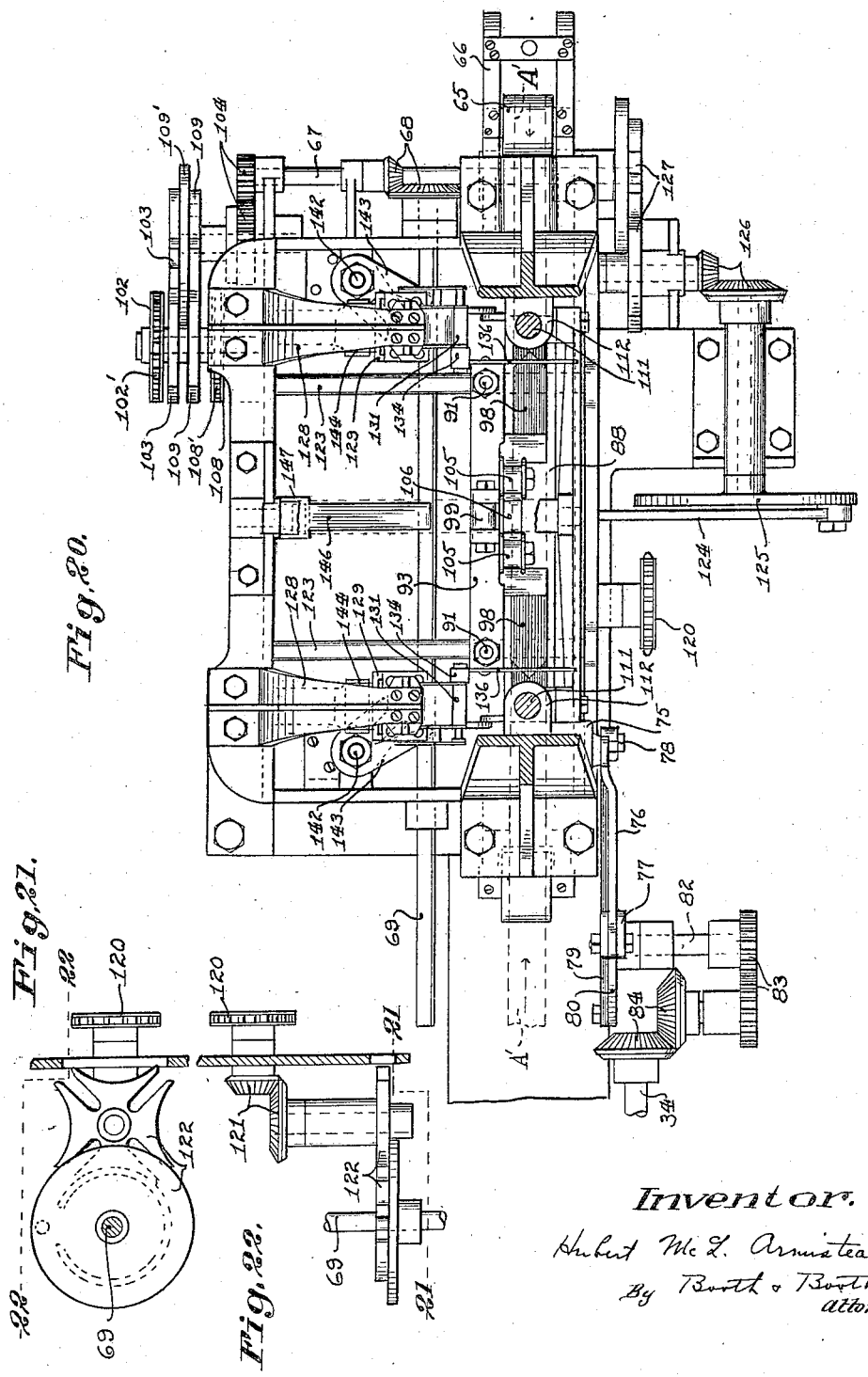

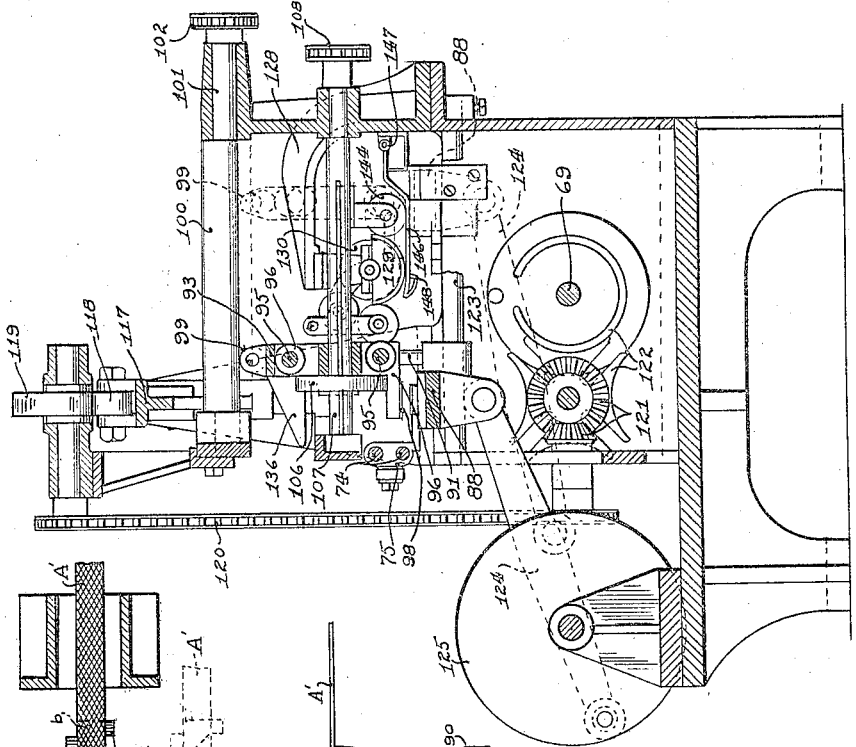

Jan. 20, 1925. 1,523,625
H. McL. ARMISTEAD
MACHINE FOR MAKING AND ATTACHING TYPEWRITER RIBBON CLIPS
Filed Dec. 27, 1922   10 Sheets-Sheet 8
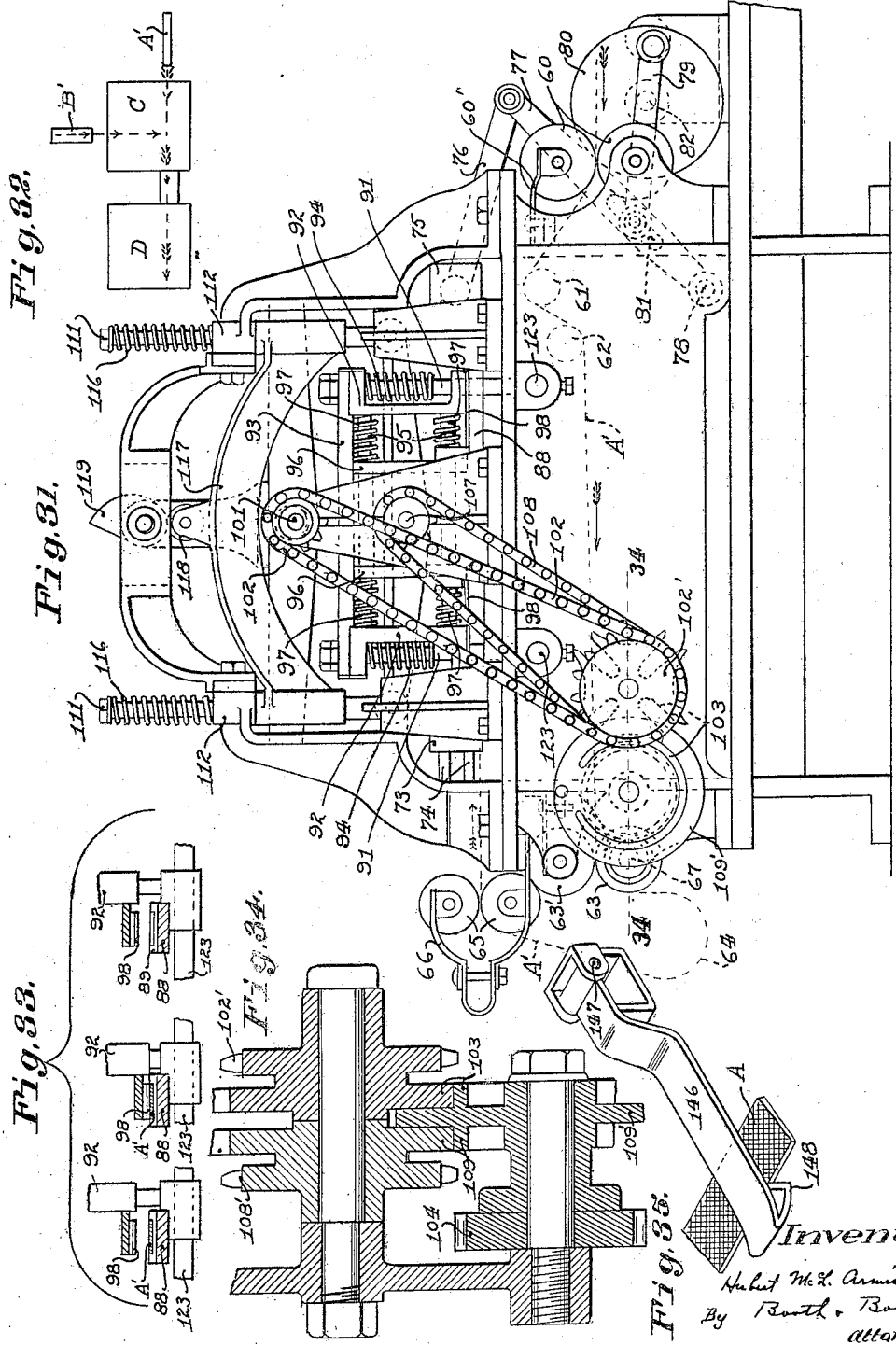

Jan. 20, 1925.  1,523,625
H. McL. ARMISTEAD
MACHINE FOR MAKING AND ATTACHING TYPEWRITER RIBBON CLIPS
Filed Dec. 27, 1922    10 Sheets-Sheet 9
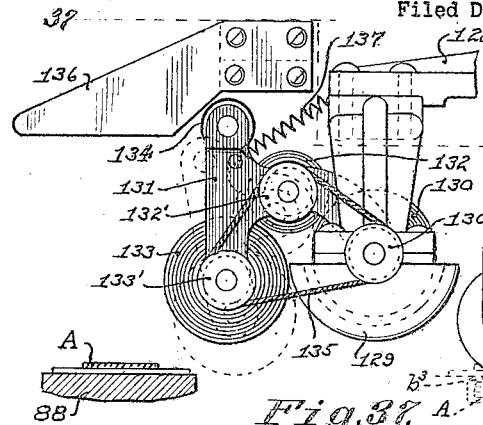
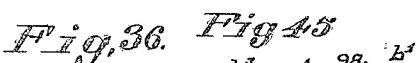
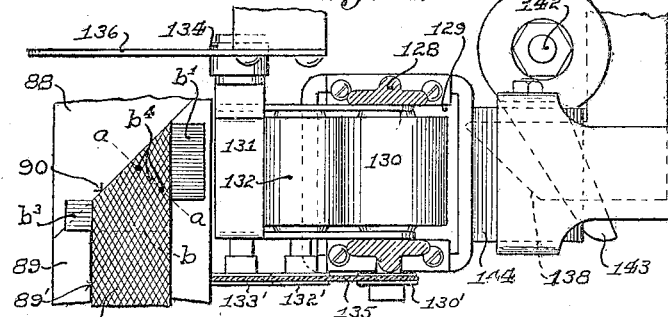
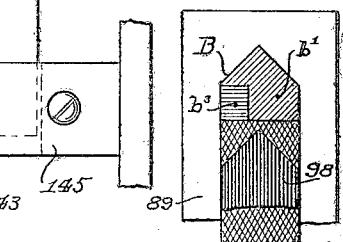
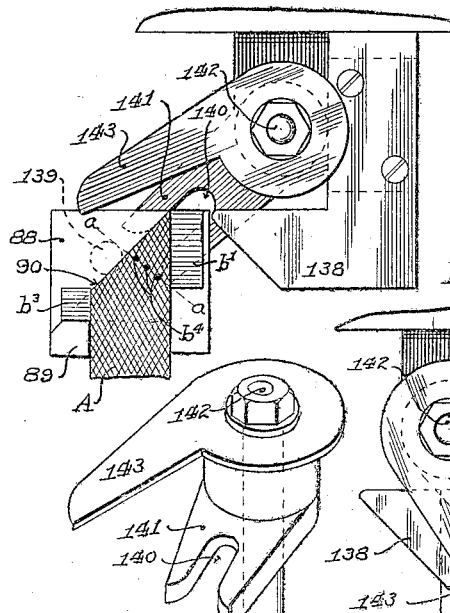
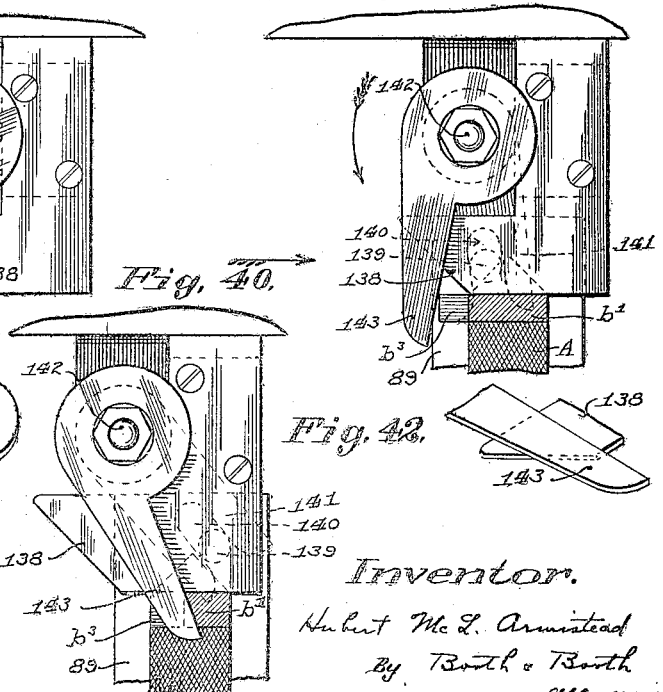

Jan. 20, 1925.    1,523,625
H. McL. ARMISTEAD
MACHINE FOR MAKING AND ATTACHING TYPEWRITER RIBBON CLIPS
Filed Dec. 27, 1922    10 Sheets-Sheet 10

Inventor.
Hubert McL. Armistead
By Booth & Booth
attorneys.

Patented Jan. 20, 1925.

1,523,625

UNITED STATES PATENT OFFICE.

HUBERT McL. ARMISTEAD, OF SAN FRANCISCO, CALIFORNIA, ASSIGNOR TO MANIFOLD IMPRESSIONS CORPORATION, OF CARSON CITY, NEVADA, A CORPORATION OF NEVADA.

MACHINE FOR MAKING AND ATTACHING TYPEWRITER-RIBBON CLIPS.

Application filed December 27, 1922. Serial No. 609,348.

*To all whom it may concern:*

Be it known that I, HUBERT McL. ARMISTEAD, a citizen of the United States, residing at the city and county of San Francisco, and State of California, have invented certain new and useful Improvements in Machines for Making and Attaching Typewriter-Ribbon Clips, of which the following is a specification.

My invention relates to the preparation of impression ribbons for certain uses in connection with typewriters and like type impact machines, adapting them for ready connection, by making and attaching their securing clips. In the manifolding art by which typing machines are made capable of producing a plurality of copies, an approved practise comprises the association with the machine of one or more short lengths of manifolding ribbon, carried by movable members by which they are adapted to be placed between the sheets of paper, in functional position in the line of type impact. The ends of the ribbon sections are fitted with clips by which their attachment to the carying members may be readily effected and the sections held under proper tension. A ribbon section of this kind with its end clips is disclosed in Letters Patent of the United States No. 1,420,874, dated June 27, 1922, and as my invention concerns especially this ribbon, and consists in a novel machine for making and attaching its end clips, I have herein illustrated said ribbon, apart from the machine, in Figs. 46 to 52, inclusive, on Sheet 10 of the drawings, and shall describe it in sufficient detail to insure a ready understanding of my machine and its several functions.

Referring to the accompanying drawings:—

Fig. 3 is a front elevation of the mechanism shown in Fig. 1.

Fig. 4 is a fragmental section, taken in the direction of the arrow, on the line 4—4 of Fig. 3, showing the clip blank forming punch and die.

Fig. 5 is a horizontal section on the line 5—5 of Fig. 4.

Fig. 6 is plan view, enlarged, of the clip blank die.

Figs. 7 and 8 are partly broken vertical sections of the blank punch and die, taken respectively on the lines 7—7 and 8—8 of Fig. 6, and showing the punch in two different positions.

Fig. 9 is a perspective view of the punch.

Figure 11:
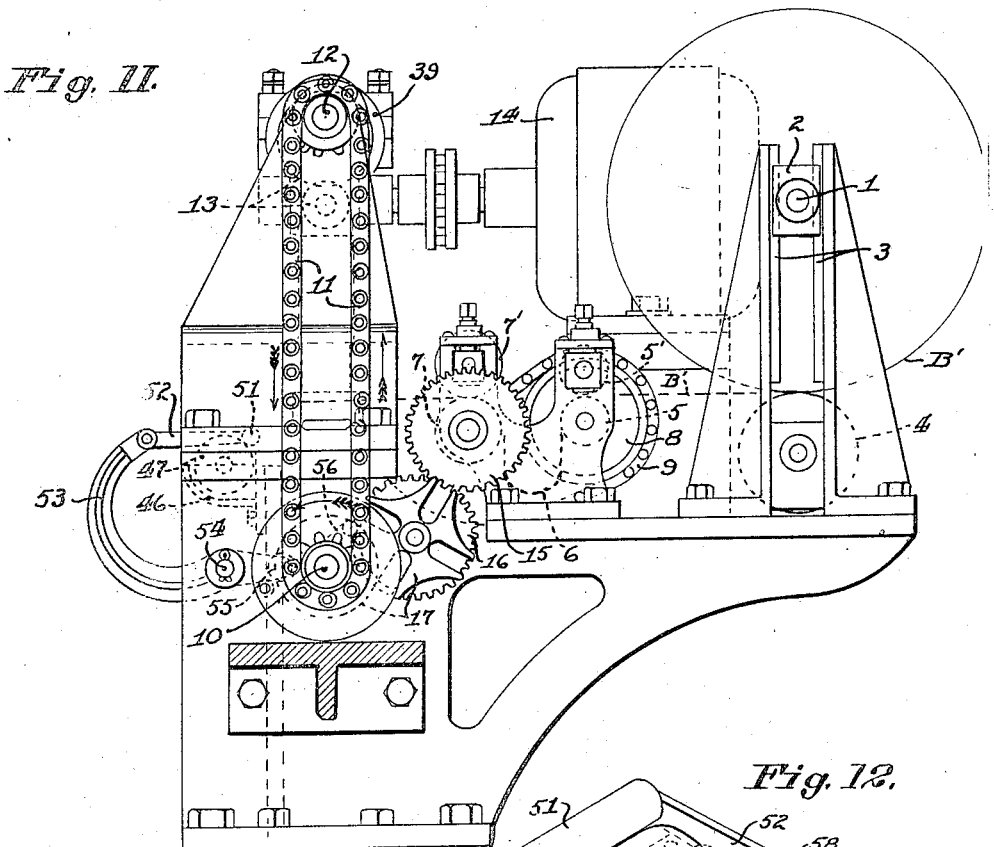

Figs. 10 and 11 are opposite end elevations of the mechanism shown in Fig. 3, being taken in the direction of the arrows on the respective lines 10—10 and 11—11 of said Fig. 3.

Figure 12:
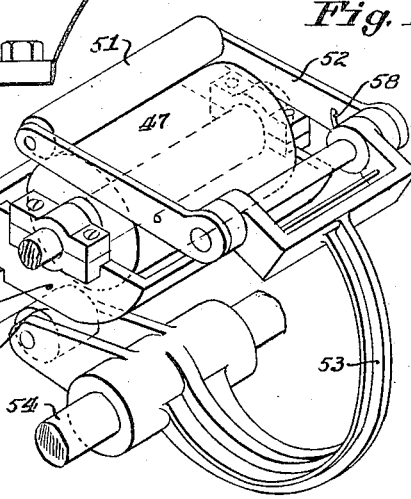

Fig. 12 is a perspective view, enlarged, of the ribbon moistening means.

Figure 13:
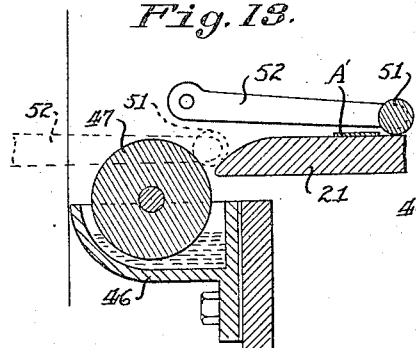

Fig. 13 is a vertical section of a portion of the same.

Figure 14:
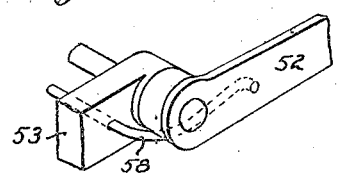

Fig. 14 is a perspective detail of a portion of the same.

Fig. 15 is a rear elevation of the portion of the machine comprising the mechanism for cutting the ribbon and folding the clips into final form.

Figs. 16 and 17 are respectively a plan and an elevation, enlarged, of a portion of the ribbon feed mechanism.

Fig. 18 is a perspective view of the feed member shown at the right of Figs. 16 and 17.

Fig. 19 is a perspective view of the feed member shown at the left of Figs. 16 and 17.

Fig. 20 is a sectional plan view of the folding and cutting mechanism, taken on the line 20—20 of Fig. 15.

Figs. 21 and 22 are respectively a sectional elevation and a sectional plan of the Geneva mechanism shown in dotted lines in the lower central portion of Fig. 15, Fig. 21 being taken on the dotted line 21—21 of Fig. 22, and Fig. 22 being taken on the line 22—22 of Fig. 21.

Fig. 23 is a transverse vertical section of the cutting and folding mechanism, taken in the direction of the arrow on the line 23—23 of Fig. 15.

Figs. 24 and 25 are similar plan views of the ribbon holding carriage, showing the clamping members or presser feet in two different positions.

Figs. 26 and 27 are similar elevations of the same, Fig. 26 coresponding to Fig. 24 and Fig. 27 to Fig. 25.

Fig. 28 is a perspective detail, enlarged, of one end of the carriage.

Figs. 29 and 30 are fragmental front and side views, respectively, of one of the ribbon cutting knives and its adjustable support.

Fig. 31 is a front elevation of the cutting and folding mechanism.

Fig. 32 is a diagram showing the relative positions of the clip blank cutting mechanism and the ribbon cutting and folding mechanism, and the respective courses of the clip blank strip and the ribbon strip through the machine.

Fig. 33 is a transverse sectional detail, partly diagrammatic, showing the ribbon clamping means in three different positions.

Fig. 34 is a sectional detail, enlarged, of the double Geneva mechanism shown at the left of Fig. 31, and is taken on the line 34—34 of said Fig. 31.

Fig. 35 is a perspective detail of the ribbon ejecting means.

Fig. 36 is an end elevation, enlarged, of one of the clip moistening and pressing mechanisms.

Fig. 37 is a plan of the same, taken on the line 37—37 of Fig. 36.

Figs. 38, 39 and 40 are plan views, enlarged, of one set of folding means, respectively showing three successive positions thereof.

Fig. 41 is a perspective detail, enlarged, of one of the movable folding blades.

Fig. 42 is a perspective detail, enlarged, showing the relative positions of the movable and fixed folding blades.

Fig. 43 is a plan detail of one end of the ribbon carriage, showing the ribbon and clip clamped thereon, before being folded.

Fig. 44 is a similar view showing the ribbon and clip in their final form.

Fig. 45 is a section on the line 45—45 of Fig. 43.

Figure 46:
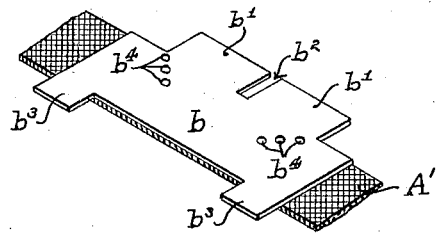

Fig. 46 is a perspective view showing one clip blank attached to the ribbon strip.

Figure 47:
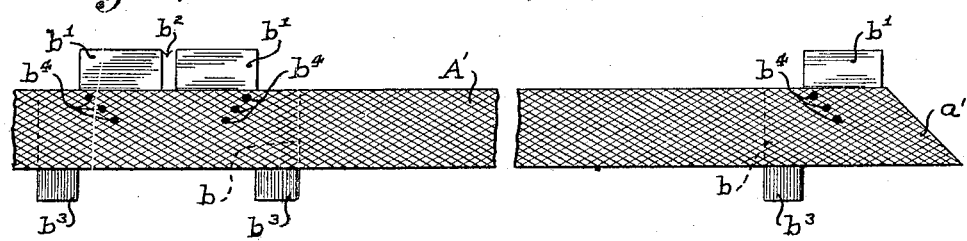

Fig. 47 is a plan view of an uncut portion of the ribbon strip, showing the blanks for forming clips at each end of a unit section thereof.

Figure 48:
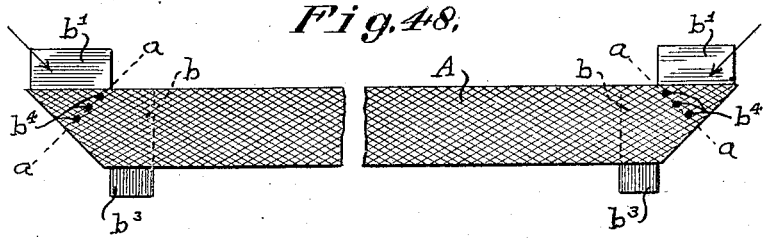

Fig. 48 is a plan view of a unit section of ribbon with its clip blanks and ends cut and ready for folding.

Figure 49:
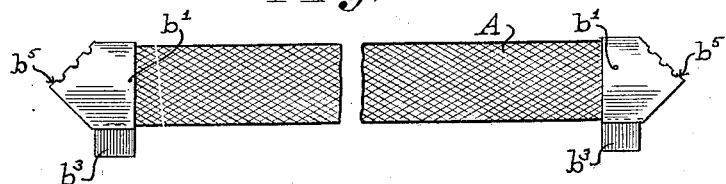

Fig. 49 shows the same after the first folding operation.

Figure 50:
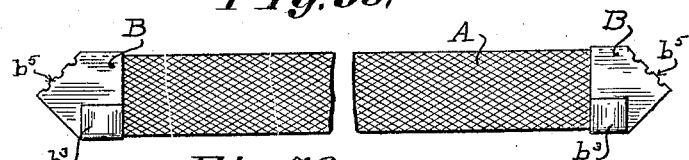

Fig. 50 shows the same after the second and final folding operation.

Figure 51:
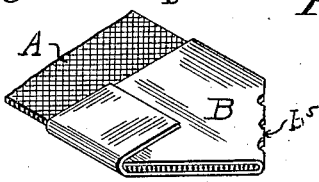
Figure 52:
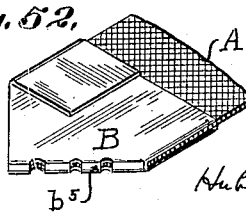

Figs. 51 and 52 are perspective views of one end of the completed ribbon, showing the clip secured thereto in its final form.

Referring first to Figs. 50, 51 and 52, on Sheet 10, the ribbon is indicated by A and the clips by B. The clips may be made of metal, fabric, paper, or other suitable bendable material, though in practise, paper for many reasons is preferred. The blank from which the clips B are formed, as initially stamped or cut out is shown in Fig. 46 and comprises a body portion $b$, two flaps $b'$ projecting from one side and separated by a slot $b^2$, and two other flaps $b^3$ extending from the other side. The flaps $b^3$ are at the ends of the blank, while the flaps $b'$ lie between and back of the ends. The clip blank is gummed flat; as shown, on the strip $A^1$ from which the ribbon A is subsequently cut, and two converging lines of holes $b^4$ are made in the body portion $b$ extending inwardly from the outer angles of the flaps $b'$. These holes continue through the ribbon itself as shown in Figs. 47 and 48.

In Fig. 47 the ribbon side of the gummed assembly of Fig. 46 is shown. The ribbon has been cut on a diagonal between the flaps $b'$ of a previously gummed clip blank, leaving the end as shown at the right with a tab $a'$, while at the left appears a succeeding complete clip blank.

In Fig. 48 the ribbon tab $a'$ at the right has been cut off on a reverse diagonal, while at the left the ribbon is cut as shown on a diagonal similar to the diagonal which formed the right end tab $a'$ in Fig. 47. Thus there remains as shown in Fig. 48 a single or unit length or section of ribbon, each end having gummed to it one half of a clip blank, and being trimmed preparatory to folding.

In Fig. 49 the flaps $b'$ and the ends of the ribbon have been folded over on the dotted lines $a$—$a$ of Fig. 48 through the lines of holes $b^4$, and the flaps $b'$ gummed down, thus forming the diagonal notched crease fold $b^5$ for the reception of the carrying members to which the clips are to be secured, as set forth in said Patent No. 1,420,874.

In Fig. 50 the other flaps $b^3$ have been folded over and gummed down, thus forming the completed clip ends, one of which is further shown in Figs. 51 and 52.

Referring, for the moment, to Fig. 32, on Sheet 8 of the drawings, the paper or other material from which the clip blanks $b$ of Fig. 46 are stamped, is fed into the machine from the rear in the form of a continuous and previously gummed strip B', while the ribbon, also in the form of a continuous strip A', is fed in from the side, at right angles to the strip B'. At the position indicated by C the first operation, viz.—stamping the double clip blank, pressing it upon the ribbon, and punching the holes $b^4$, with the result shown in Fig. 46, is performed by the mechanism illustrated in detail in Figs. 1 to 14 inclusive. This operation is performed successively, at properly spaced intervals on the ribbon strip A′, and said ribbon strip, with the clip blanks attached thereto, then travels on to the position D of Fig. 32, where the succeeding operations of cutting and folding its ends, as shown in Figs. 47 to 50, are performed by mechanism illustrated in detail in Figs. 15 to 31 and 33 to 45, inclusive.

Figure 1:
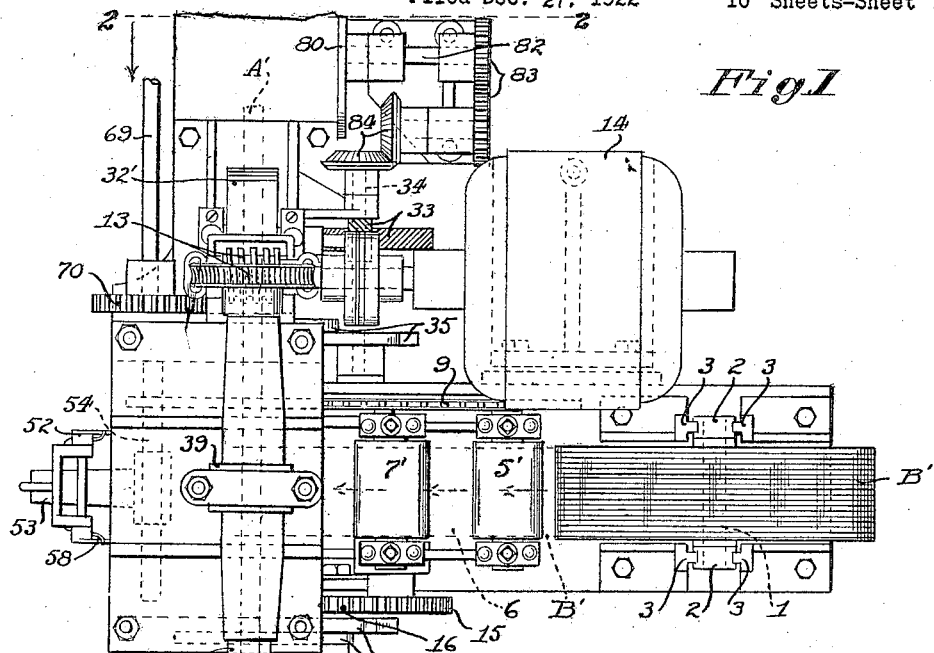
Fig. 1 is a plan view of the portion of the machine comprising the mechanism for forming the clip blanks and initially attaching them to the strip of manifolding ribbon.

Turning now to the blank stamping mechanism at the position C of Fig. 32, the clip-blank stock or strip B′ is carried in a coil or reel previously wound upon a mandrel 1, Figs. 1, 10, and 11, and said mandrel is journaled in trunnion blocks 2 which are vertically slidable in guides 3. The coil of paper strip B′ rests upon an idler roll 4, Figs. 10 and 11, and said strip is passed first between a pair of continuously rotating feed rolls 5 and 5′, is then looped as at 6, to accommodate the necessary slack, and is subsequently passed between a pair of intermittently rotating feed rolls 7 and 7′, thus providing a steady feed from the coil, to prevent said coil from running ahead, and at the same time providing a properly timed intermittent feed to the stamping die.

The feed rolls 5 and 5′ are continuously rotated by means of a sprocket 8, Fig. 10, secured to the shaft of the lower roll 5 of the pair, and said sprocket is connected by a chain 9 with a sprocket 9′ secured upon a horizontal shaft 10, which is connected by a chain 11, Figs. 1, 3 and 11, with a horizontal shaft 12 journalled at the top of the machine. The shaft 12 is driven by worm gearing 13 from the shaft of a motor 14, as shown in Figs. 1, 3, 10 and 11. This motor also supplies the power for operating all other parts of the machine, as will be described hereinafter. The intermittent feed rolls 7 and 7′ are driven by a gear 15, Figs. 1 and 11, fixed upon the shaft of the lower roll 7 of the pair, said gear meshing with an idler gear 16, which in turn, is driven in a step-by-step motion by a Geneva mechanism 17, Figs. 1, 3 and 11, from the continuously rotating shaft 10. The upper feed rolls 5′ and 7′ are driven by frictional contact with the lower corresponding rolls 5 and 7.

The clip blank strip B′ is pushed by the intermittent feed rolls 7 and 7′ into a guideway formed between the fixed die 18 and an overlying guide plate 19, as shown in Figs. 3, 6, 7 and 8. The die 18, shown in plan in Fig. 6, has an aperture 20 of the form of the clip blank as described above and illustrated in Fig. 46. Said die and the guide plate 19 are spaced above a bed plate 21, and are removably secured thereto by means of bolts or screws 22, Figs. 6 and 7. The ribbon strip A′ is fed through, immediately above the bed plate 21, at right angles to the direction of the clip blank strip B′, as shown by the dotted lines and arrows in Fig. 6. Said ribbon strip thus lies below the clip blank strip, as shown in Fig. 7.

The supply of ribbon strip A′ is carried as a coil, Fig. 1, wound upon a mandrel 23 which is carried by trunnion blocks 24 vertically slidable in guides 25, and said coil is supported, in a manner similar to the coil of clip blank strip B′ described above, by an idler roller, not shown. The ribbon strip A′ is passed between a pair of continuously driven fed rolls 26 and 26′, Figs. 1 and 3, to provide a steady feed from the coil, and is then looped as at 27, and passed between a pair of idler rolls 28. The lower feed roll 26 is continuously driven by spiral gearing 29, a horizontal shaft 30, and spur gears 31 from the continuously rotating shaft 10. The upper feed roll 26′ is driven by frictional contact with the lower roll 26.

Figure 2:
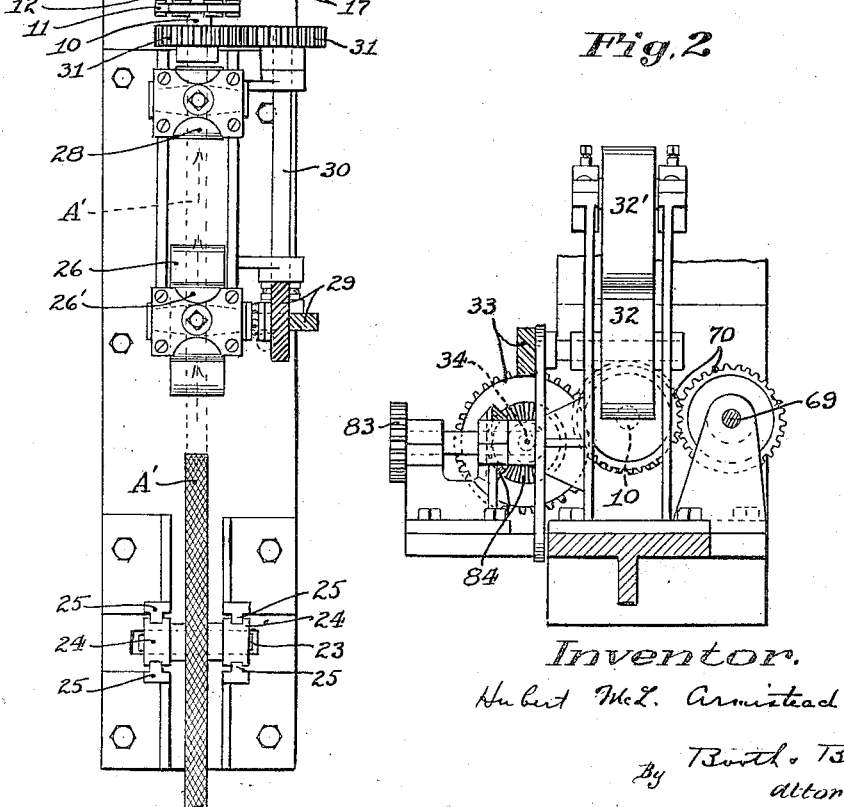
Fig. 2 is a fragmental section taken in the direction of the arrow on the line 2—2 of Fig. 1.

After leaving the idler rolls 28, the ribbon strip A′ is drawn through above the bed plate 21 and below the die 18, by a pair of intermittently rotated feed rolls 32 and 32′, Figs. 1, 2 and 3 positioned at the opposite side of the machine. The roll 32 is driven in a step-by-step motion, by spiral gearing 33, Figs. 1, 2 and 3, from a short horizontal shaft 34, which in turn is driven by a Geneva mechanism 35, Figs. 1, 3 and 10, from the continuously rotating shaft 10. The upper roll 32′ is driven by frictional contact from the lower roll 32.

The punch 36 cooperating with the die 18 for forming the clip blanks is carried by the lower end of a plunger 37, Figs. 3, 4 and 5, which reciprocates vertically in guides 38, and is operated by an eccentric 39 on the upper horizontal shaft 12. Said punch, whose working face is shown in Fig. 9, is fixed to a plate 36′, which in turn is secured to a central pin 40, Fig. 7, which is slidably mounted in a socket formed in the lower end of the plunger 37 and pressed downward by a spring 41. Bolts 42, fixed in the punch carrying plate 36′ and passing freely through a flange 37′ at the lower end of the plunger, serve to limit the downward movement of the punch with respect to said plunger, and also to prevent it from turning.

The punch 36 has formed in it six vertical holes 43, as shown in Fig. 9, positioned to correspond with the holes $b^4$ in the clips and ribbon, as described above and shown in Fig. 46. Within each of these holes 43 is a punch or rod 44, Figs. 7 and 8, said rods being held firmly against the flat lower surface of the plunger flange 37′ by springs 44′, as shown in Fig. 8, and slidable in the holes 43 of the punch 36. The rods 44 are of such a length that their lower ends are flush with the bottom of the punch 36 when the latter is in its normal position, as shown in Fig. 7. The bed plate 21 is provided with holes 45 corresponding in position to the holes 43 in the punch.

The downward movement of the plunger 37, Fig. 7, first causes the punch 36 to cut out a clip blank from the strip B' lying immediately above the die 18, and then pushes the cut blank down through said die, pressing it upon the ribbon strip A' lying upon the bed plate 21. The plunger then continues its downward movement for a sufficient distance to cause the rods 44 to punch the holes $b^4$ through both the blank $b$ and the ribbon strip A', as shown in Fig. 8, the punch 36 remaining stationary and the spring 41 contracting during this final stage of the movement of the plunger 37. The plunger then returns to its upper position, as shown in Fig. 7, and the clip blank strip B' and the ribbon strip A' are advanced the necessary distance by their respective feed rolls described above, and the operation is complete.

The clip blank strip B' has been previously gummed, as before stated, and is fed into the machine with the gummed side down. In order to cause the cut blank $b$ to adhere to the ribbon strip A', said ribbon strip is moistened on its upper surface immediately prior to the stamping of the clip blank and the pressing thereof upon said ribbon.

For this purpose there is provided in front of the bed plate 21 a water container 46, Figs. 3, 11, 12 and 13, in which is journaled a roll 47. Said roll is continuously rotated by means of a pair of spur gears 48, Figs. 3 and 10, and a chain 49, from the shaft 10. The chain 49 is, in reality, continuous with the chain 9, as shown in Fig. 10, the lower run passing under the sprocket 9' and the upper run passing under an idler 50.

The water is transferred from the rotating roll 47 to the ribbon by a smaller roll 51, Figs. 11, 12 and 13, mounted on a carriage 52, and adapted to be moved rearwardly, into the space between the die 18 and the bed 21, by an arm 53, Figs. 10, 11 and 12, which is carried by an oscillatory shaft 54 and has a roller 55 adapted to follow a cam 56, Fig. 10, fixed upon the shaft 10. The transfer roll 51 is normally held in contact with the rotating water roll 47, as shown in Fig. 12 and in dotted lines in Fig. 13, by springs 57, Fig. 3, positioned at the ends of the shaft 54 of the cam 53, and is moved rearwardly by the cam 56 and the arm 53, over the bed 21 and the surface of the ribbon strip A', to the position shown in full lines in Fig. 13, and immediately returned to its normal position before the downward movement of the clip blank stamping punch. A spring 58, Figs. 12 and 14, is provided to insure contact between the transfer roll 51 and the ribbon strip A' and the water roll 47.

The ribbon strip A' with the clip blanks secured to its upper surface at regular intervals, passes out of the mechanism described above, which as before stated is located at the position C of the diagram, Fig. 32, and enters the mechanism indicated by D, which is shown in detail in Figs. 15 to 31 and 33 to 45 inclusive, and which will now be described.

The ribbon strip A' enters this mechanism from the left of Fig. 15, which is a rear elevation, or from the right of Fig. 31, which is a front elevation, as indicated by the dotted line and arrows. At the extreme left of Fig. 15 are shown the intermittent feed rolls 32 and 32' described above and shown in Figs. 1, 2 and 3. Leaving these rolls, the ribbon strip A' is looped at 59 to provide necessary slack, and is passed between a pair of idler tension rolls 60, the upper one of the pair being carried by a spring bracket 60', Figs. 15 and 31, then over a guide roll 61 and under a second guide roll 62, and across the machine to a pair of continuously driven feed rolls 63 and 63'. From these the ribbon strip A is looped, at 64, to provide slack, and is then inverted and carried back into the machine through a pair of tension idler rolls 65 mounted in a spring bracket 66. The ribbon strip is thus carried into the operative portion of the machine with the clip blanks on its under surface, in order to provide for the folding of the flaps of said blanks as will be hereinafter described.

The feed roll 63 is fixed upon a shaft 67, Figs. 15 and 31, which is continuously driven by a pair of bevel gears 68, Fig. 20, from a shaft 69, which is extended from the clip blank forming mechanism described above. Said shaft 69, as shown in Figs. 1, 2 and 3, is driven by a pair of spur gears 70 from the continuously rotating shaft 10. The upper roll 63' is driven from the lower roll 63 by frictional contact therewith.

The end portion of the ribbon strip A', after passing through the tension rolls 65, lies under a clamping or tension spring 72, Figs. 16, 17 and 19, secured to a bracket 73 horizontally adjustable on a pair of fixed transverse guide rods 74, Figs. 15, 16 and 17. A sliding bracket 75 is also mounted on said guide rods, and is reciprocally moved across the machine by a link 76, Figs. 15, 20 and 31, and a lever 77, the latter being pivoted at 78 and connected by a pitman 79 with a crank disk 80. The pitman 79 is adjustably connected with the lever 77 by means of a slot 81 in the latter, Figs. 15 and 31, to permit the length of the stroke, and consequently the length of travel of the bracket 75, to be varied. The crank disk 80 is fixed upon a shaft 82, Figs. 15 and 20, which is rotated intermittently by means of spur gears 83 and bevel gears 84, Figs. 1, 2 and 20, from the intermittently rotating shaft 34 described above. By means of this mechanism, the bracket 75 is periodically moved from the position shown in Fig. 15 and in full lines in Fig. 17, to the position indicated by the dotted lines in Fig. 17, and then back to its first position.

The movable bracket 75 carries a spring clip 85, formed as shown in Figs. 16, 17 and 18. Said clip has a pair of ears 86, which ride over a strip 87 secured to the fixed bracket 73, thereby lifting the end of said clip when said movable bracket 75 approaches said fixed bracket. This allows the end $a'$ of the ribbon strip $A'$ to enter between said clip 85 and a friction pad 85' secured to the bracket 75. The ears 86 of said clip then pass the inwardly turned ends of the trip 87, and said clip descends, clamping the end $a'$ of the ribbon strip between itself and the pad 85'. On the return movement of the bracket 75, the trip 87, which is pivotally mounted at 87', rides up over the ears 86 of the clip 85 without raising said clip, so that the ribbon strip remains clamped thereby and is drawn forwardly, as shown by the dotted lines in Fig. 16, a distance equal to the length of one complete ribbon section.

The portion of the ribbon strip $A'$ which is thus drawn across the machine lies upon a carriage 88 as shown in Fig. 24, and is so positioned that there is a clip blank $b$ at each end of said carriage. One section of the blank $b$ at the left of Fig. 24 has been cut in the previous operation, but a complete double blank is shown at the right. The carriage 88 is provided with lineally adjustable end portions 89, one of which is shown in Fig. 28, and said end portions are provided with shallow grooves 89' within which the end portions of the ribbon lie, and with inclined faces 90 at their ends, Figs. 24, 25 and 28, which cooperate with inclined cutting knives, to be described later, for shearing or cutting the ends of the ribbon.

The carriage 88 supports two vertical guide rods 91, Figs. 15, 20, 23 and 31, one near each end. Each rod 91 has mounted on it a movable slide 92, Fig. 31. The slides 92 are joined together by a cross bar 93 at their upper ends, and are normally held in their uppermost positions, as shown, by springs 94. The slides 92 are also connected by horizontal guide rods 95, which in turn carry a pair of horizontally movable slides 96, which are normally held in their innermost positions, as shown, by springs 97. Each horizontally movable slide 96 carries a spring presser foot 98. Said presser feet are so positioned as to be brought down upon the ribbon, as it lies upon the carriage 88, by the downward movement of the slides 92, and subsequently spread apart, to smooth and stretch the ribbon, by the outward or separating movement of the slides 96. Figs. 15, 20, 23 and 31 show the presser feet 98 in their inoperative position, Figs. 24 and 26 show them after their first, or downward movement, and Figs. 25 and 27 show them after their second or horizontal movement, the ribbon A being stretched and held flat upon the carriage 88.

The operation of said presser feet 98 is shown more clearly in Fig. 33, wherein the left hand view shows the ribbon strip $A'$ lying within the groove 89 of the carriage 88 and the presser foot 98 in its elevated or normal position. In the central view the presser foot 98 has descended upon the ribbon, and in the right hand view the presser foot 98 has again lifted and the ribbon has been removed.

This figure also illustrates the movement of the carriage 88 itself, as will be later described. The ends of the presser feet 98 are pointed, as shown in Figs. 24 and 25, to conform to the inclined ends 90 of the carriage 88 and the first fold of the ribbon end and clip blank, on the line $a$—$a$ of Fig. 48 as described above.

The slides 92 are moved downwardly, to bring the presser feet 98 down upon the ribbon, by means of a roller 99 carried by the upper cross bar 93, Figs. 15 and 23. Said roller engages a cam 100, which is elongated, as shown in Fig. 23, to permit fore and aft motion of the carriage 88 for purposes to be set forth hereinafter. Said cam is rotated intermittently by a rearwardly extending shaft 101, Figs. 23 and 31, a chain 102, and a Geneva mechanism 103, Figs. 20 and 31, which carries the sprocket 102' for said chain, said Geneva mechanism being driven by a pair of spur gears 104, Fig. 20, from the continuously rotating shaft 67.

The slides 96 are operated, to separate the presser feet 98 after they have been moved down by the above described mechanism into contact with the ribbon, by means of cam following rollers 105, Figs. 15 and 20, which are engaged by a cam 106. Said cam is slidable upon a feathered shaft 107—Fig. 23. The followers 105 are flanged, as shown, to cause said cam to slide along its shaft 107, to accommodate itself to the above mentioned movement of the carriage 88. The cam shaft 107 is intermittently rotated by a chain 108, Fig. 31, and a Geneva mechanism 109, Fig. 20, which carries the sprocket 108' for said chain. Said Geneva mechanism, as shown in Figs. 20 and 34, is concentric with the Geneva mechanism 103, the driving members of both being mounted upon opposite sides of a common disk 109', which is driven by the spur gears 104.

After the ribbon strip has been clamped upon the carriage 88 by the presser feet 98, it is cut off, to form a unit section, along the lines of the inclined ends 90 of said carriage, as shown in Fig. 25, by vertically movable knives 110, Fig. 15, carried by the lower ends of rods 111, Figs. 15 and 20, which slide in guides 112 carried by the frame of the machine. The knives 110 are adjustably secured to the rods 111, to permit variation in the length of the ribbon cut, as shown in Figs. 29 and 30, each rod 111 being provided with a foot 113, to which the knife 110 is secured by a tongue and groove joint 114 and a clamping screw 115. The rods 111 are normally held up by springs 116, Figs. 15 and 31, and are moved down, to cause the knives 110 to cut the ribbon, by a cross yoke 117 provided with a roller 118, Figs. 15, 23 and 31, positioned to follow a cam 119. Said cam is intermittently rotated by a chain 120, Fig. 23, a pair of bevel gears 121, and a Geneva mechanism 122, Figs. 21, 22 and 23, the driving member of said Geneva mechanism being mounted on the continuously rotating shaft 69.

After the unit length of ribbon A has been cut off, and while it is still held on the carriage 88 by the presser feet 98, as shown in Fig. 25, said carriage, and the presser foot mechanism associated therewith, is moved bodily toward the front of the machine, or toward the right as viewed in Fig. 23. To accomplish this movement, the carriage 88 is slidably mounted on horizontal guide rods 123, Figs. 15, 20 and 23, and is connected by a link 124 with a crank disk 125. Said disk is intermittently rotated, at the proper times, by bevel gearing 126, Figs. 15 and 20, and a Geneva mechanism 127, the driving member of the latter being fixed upon the continuously rotating shaft 67. This forward movement of the carriage 88 and its associated parts, which carries them from the position shown in full lines in Fig. 23 to that shown in dotted lines, effects the folding of the ends of the ribbon A and the flaps $b'$ and $b^3$ of the clip, as outlined above in connection with Figs. 49 and 50 of the drawings.

The first operation accomplished by the forward movement of the carriage 88 is the moistening of the upper gummed surfaces of the clip flaps $b'$ and $b^3$, which lie in the position shown in Figs. 25, 37, 43 and 48. For this purpose there are provided two fixed brackets 128, Figs. 20, 23 and 36, one positioned over the path of travel of each end portion of the ribbon A as it lies on the carriage 88. Each bracket 128 supports a water container 129, Figs. 23 and 36, in which is a rotatable roll 130. A forwardly extending swinging bracket, shown at 131 in Figs. 36 and 37, is pivotally mounted about the shaft of said roll 130, and said bracket carries two rotatable water rolls 132 and 133, and a cam follower 134. The rolls 130, 132 and 133 form a train, as shown, being positioned with their surfaces sufficiently close together to cause the transfer of the film of water from one to the other, and are connected together, to cause them to rotate in the same direction, by a belt 135 passing over pulleys 130', 132' and 133', respectively, mounted on the projecting ends of the shafts of said three rolls. The cam follower 134 is positioned to ride upon the under surface of a cam 136 secured to the carriage slide members 92 and 93, as shown in Figs. 15, 20 and 23, and therefore movable forwardly with said carriage. This causes the bracket 131 to be depressed, to the position shown in dotted lines in Fig. 36, so that the roll 133 bears upon the upper surfaces of the clip flaps $b^1$ and $b^3$, and transfers its moisture thereto, as the latter are carried forwardly by the carriage 88 beneath said roll. The rotation of all three rolls 130, 132 and 133 is effected by the frictional contact between the carriage and the roll 133. A spring 137 normally holds the bracket 131 in the position shown in full lines in Fig. 36.

After passing beneath the moistening roll 133, the continued forward movement of the carriage 88 causes the clip flap $b'$ to be engaged by a stationary folding blade 138, Figs. 37 to 40, inclusive. The ribbon end is still held in the groove 89 of the carriage 88 by the presser foot 98, as shown in Fig. 43, although said presser foot has been omitted from Figs. 37 to 40, in order to show the ribbon beneath. This causes the clip flaps $b'$ and $b^3$ to be slightly elevated, by the shoulders of the carriage groove 89, as shown in Fig. 45, so that said flaps may be engaged by the folding blades. The fixed folding blade 138, which has an inclined end, as shown in Figs. 37 to 40, therefore engages the flap $b'$, as the carriage passes beneath it, and folds said flap $b'$ and the end of the ribbon A over on the line $a$—$a$, this line corresponding with the end of the presser foot 98, as shown in Fig. 43. This results in the condition shown in Figs. 39 and 49, and described at the beginning of this specification.

At the same time, a pin 139, Figs. 15 and 38 projecting downwardly from the carriage 88, engages a slot 140, Figs. 38 to 41, in a horizontally swinging arm 141. Said arm is pivotally mounted upon a stud 142 and has connected with and spaced above it a movable folding blade 143. Thus the forward movement of the carriage 88 causes the movable blade 143 to swing forwardly from the position shown in Fig. 38, through that shown in Fig. 39, to its final position as shown in Fig. 40, and to engage the clip flap $b^3$ and fold the same over, as shown. The movable blade 143 is positioned to immediately overlie the fixed blade 138, as shown in Figs. 39, 40 and 42, and its movement is so timed as to cause it to engage the flap $b^3$ immediately after the flap $b'$ has been folded over, as shown in Fig. 39.

While the flap $b^3$ is being folded over by the movable blade 143, the presser foot 98 is withdrawn, by its operating mechanism described above, from the position shown in Fig. 43 to that shown in Fig. 44, and, at practically the same time, the carriage 88 comes to rest beneath a presser roll 144, Figs. 36 and 37. Said presser roll is mounted on a spring bracket 145, and bears upon the fixed and movable blades 138 and 143 respectively, and, through them, presses the folded clip B against the carriage 88 with sufficient force to cause the proper adhesion of the flaps $b'$ and $b^3$, resluting in the finished ribbon as shown in Fig. 50. It should be again noted that the moistening, folding, and pressing mechanism described above and numbered from 128 to 145 inclusive, is duplicated at the two ends of the machine, as indicated in Fig. 20, so that both ends of the ribbon are finished simultaneously.

The carriage now begins its rearward, or return movement, the pins 139 returning the movable folding blades 143 to their normal positions. During this return movement of the carriage, the presser feet 98 are also returned to their normal positions, leaving the finished ribbon lying freely upon the carriage, and said ribbon is engaged and removed from said carriage by a finger 146, Figs. 20, 23 and 35. Said finger is pivotally mounted at 147 upon a fixed support, and has a beveled tooth 148 upon its forward end, so that it rides up over the carriage and ribbon upon their forward movement, but engages said ribbon and removes it from the carriage upon the rearward return movement of the latter. The finished ribbon then falls to any suitable place of deposit not shown in the drawings, and the carriage returns to its rearward position in readiness for the reception of the next succeeding length of ribbon strip. Thus the cycle of operations is complete, and the parts are in position for a repetition of the operations as described.

The necessary parts of the machine, are adjustable, within certain limits, to enable it to attach clips to ribbons of slightly greater or less length. The bracket 73, Fig. 15, as before stated, may be shifted along the guide rods 74, and the stroke of the sliding bracket 75 may be correspondingly varied by shifting the connection between the pitman 79 and the lever 77 in the slot 81. The effective length of the carriage 88 may be varied by shifting the grooved end portions 89, Figs. 24 and 28 upon said carriage, and the cutting knives 110 may be shifted upon their carrying rods 111 to correspond, as shown in Figs. 29 and 30. To accommodate such adjustments, the ribbon strip feed rolls 26 and 26′ of Figs. 1, 32 and 32′ and 63 and 63′ of Fig. 15 must be replaced by similar rolls of the proper diameter.

A brief résumé of the operation of the machine may conduce to a better understanding of the foregoing description. The clip blank strip $B'$ and the ribbon strip $A'$ enter the machine, at the position C of Fig. 32, at right angles to each other, the clip blank strip being above and the ribbon strip below. Both are fed intermittently, the clip blank strip $B'$ advancing a distance equal to the width of a blank at each motion, and the ribbon strip $A'$ advancing simultaneously a distance equal to the length of a completed ribbon section A. During each period of rest of the two strips $B'$ and $A'$, the mechanism at the position C stamps a clip blank from the strip $B'$ and presses it flat, upon the upper surface of the ribbon strip $A'$. The blank strip $B'$, it will be remembered, has been previously gummed upon its under surface, and the upper surface of the ribbon strip $A'$ is moistened, immediately prior to the stamping of the clip blank, to cause said blank to adhere to said ribbon strip.

The ribbon strip $A'$, with the clip blanks secured at regular intervals thereto, then travels on to that portion of the mechanism located at the position D of Fig. 32, and is inverted to bring the ribbon strip above the blanks. Said ribbon strip is drawn into this mechanism by the reciprocating slide bracket 75, which advances the strip, at each stroke, a distance equal to one complete ribbon length, and lays the portion thus drawn out upon the carriage 88, as in Fig. 24. This portion of the ribbon is then clamped upon said carriage by the presser feet 98, and its ends are cut off by the knives 110, leaving the ribbon length A with approximately one half of a clip blank at each end, as shown in Figs. 25 and 48.

The carriage 88 then moves forwardly, causing the moistening, folding and pressing of the clip flaps $b'$ and $b^3$ as described, resulting in the completed ribbon as shown in Fig. 50, which is removed from the carriage 88 during the return of said carriage to its normal position. The driving mechanism of the machine is so constructed that these operations occur in a fixed phase relation to the stamping of the clip blanks from the blank strip $B'$, so that for every such blank formed and applied to the ribbon strip $A'$ at the position C of Fig. 32, one ribbon length A is cut and has its clip ends folded at the position D. The machine, when once set in operation, is entirely automatic, its various functions being repeated, in the same sequence and time relation, as long as the strips $A'$ and $B'$ continue to be supplied and the driving motor 14 is energized.

I claim:—

1. A machine for the described purpose comprising means for automatically advancing a ribbon in the direction of its length; means for forming clip blanks and securing the same at intervals upon said ribbon; and associated devices for folding said blanks over said ribbon to form clips therefor.

2. A machine for the described purpose comprising means for automatically advancing a ribbon in the direction of its length; means for securing formed clip blanks at intervals upon said ribbon; and associated devices for folding said blanks over said ribbon to form clips therefor.

3. A machine for the described purpose comprising means for automatically advancing, in the direction of its length, a ribbon having formed clip blanks secured at intervals thereupon; and associated devices for folding said blanks over said ribbon to form clips therefor.

4. A machine for the described purpose comprising means for receiving and holding a ribbon having a formed clip blank secured to its end portion, said blank having a flap extending laterally beyond the edge of the ribbon; and means for folding the blank and the end portion of the ribbon at an angle to the longitudinal axis of said ribbon, and for folding said flap upon a line substantially parallel to said axis to form a clip for the ribbon end.

5. A machine for the described purpose comprising means for securing a formed clip blank to the end portion of a ribbon, said blank having a flap extending laterally beyond the edge of the ribbon; and means for folding the blank and the end portion of the ribbon at an angle to the longitudinal axis of said ribbon, and for folding said flap upon a line substantially parallel to said axis to form a clip for the ribbon end.

6. A machine for the described purpose comprising means for forming a clip blank and securing the same to the end portion of a ribbon, said blank having a flap extending laterally beyond the edge of the ribbon; and means for folding the blank and the end portion of the ribbon at an angle to the longitudinal axis of said ribbon, and for folding said flap upon a line substantially parallel to said axis to form a clip for the ribbon end.

7. A machine for the described purpose comprising means for forming clip blanks and securing the same at intervals upon a ribbon; devices for forming said ribbon into lengths by cutting it in the regions of said blanks, each length of ribbon having at least two blanks secured thereto, and associated mechanism for simultaneously folding said blanks to form clips for said ribbon length.

8. A machine for the described purpose comprising means for securing clip blanks at intervals upon a ribbon; devices for forming said ribbon into sections by cutting it in the region of said blanks; each section having at least two blanks secured thereto; and associated mechanism for simultaneously folding said blanks to form clips for said ribbon section.

9. A machine for the described purpose comprising means for receiving a ribbon having clip blanks secured at intervals thereto; associated devices for forming said ribbon into sections by cutting it in the region of said blanks each section having at least two blanks secured thereto; and means for simultaneously folding said blanks to form clips for said ribbon section.

10. A machine for the described purpose comprising means for receiving a ribbon having clip blanks secured at intervals thereto; devices for forming said ribbon into sections by cutting it at said blanks so that each section has a portion of a clip blank secured to each of its ends; and associated mechanism for simultaneously folding said blank portions to form complete clips for the ends of the cut ribbon section.

11. A machine for the described purpose comprising a carriage for receiving and holding a ribbon having a clip blank secured thereto; means for moving said carriage; and associated mechanism for folding said blank, during the movement of said carriage, to form a clip.

12. A machine for the described purpose comprising a carriage for receiving and holding a ribbon having a clip blank secured thereto; means for moving said carriage; and mechanism controlled by the movement of said carriage for folding said blank to form a clip.

13. A machine for the described purpose comprising a carriage having a groove for receiving a ribbon having a clip blank secured thereto; means for holding said ribbon within said groove; means for moving said carriage; and associated mechanism for folding said blank during the movement of said carriage to form a clip.

14. A machine for the described purpose comprising a carriage having a groove for receiving a ribbon having a clip blank secured thereto; means for varying the length of said groove; devices for holding the ribbon within said groove; and associated mechanism for folding said blank to form a clip.

15. A machine for the described purpose comprising a carriage; grooved members adjustably mounted on said carriage for receiving and holding a ribbon having clip blanks secured thereto; devices for holding the ribbon within the grooves of said members; and associated mechanism for folding said blank to form a clip.

16. A machine for the described purpose comprising a carriage; grooved end members mounted on said carriage for receiving and holding a portion of a ribbon strip having a clip blank secured thereto; means for holding said ribbon within the grooves of said end members; devices cooperating with said end members for cutting said ribbon; and associated mechanism for folding said blank to form a clip for the cut portion of said ribbon.

17. A machine for the described purpose comprising a carriage; grooved end members adjustably mounted on said carriage for receiving and holding a portion of a ribbon strip having a clip blank secured thereto; adjustable knives cooperating with said end members for cutting said ribbon; and associated mechanism for folding said blank to form a clip for the cut portion of said ribbon.

18. A machine for the described purpose comprising a carriage for receiving and holding a portion of a ribbon strip having a clip blank secured thereto; devices for cutting said ribbon portion free from the strip; means for moving said carriage; associated mechanism for folding said blank during the movement of said carriage to form a clip for the cut ribbon portion.

19. A machine for the described purpose comprising a carriage for receiving and holding a portion of a ribbon strip having a clip blank secured thereto; devices for cutting said ribbon portion free from the strip; mechanism for folding said blank to form a clip for the cut portion of the ribbon; and means for moving said carriage to carry said ribbon portion from the cutting mechanism to the folding mechanism.

20. A machine for the described purpose comprising a carriage for receiving and holding a portion of a ribbon strip having a clip blank secured thereto; means for feeding said ribbon portion on to said carriage; devices for cutting said ribbon portion free from the strip; mechanism for folding said blank to form a clip for the cut portion of the ribbon; and means for moving said carriage to carry said ribbon portion from the feeding and cutting means to the folding mechanism.

21. A machine for the described purpose comprising a member for receiving a portion of a ribbon strip having a clip blank secured thereto; means for longitudinally stretching said ribbon portion upon said member; devices for cutting the stretched ribbon portion free from the strip; and mechanism for folding said blank to form a clip for the cut ribbon portion.

22. A machine for the described purpose comprising a member for receiving and holding a portion of a ribbon strip having a clip blank secured thereto; a pair of presser feet positioned above said member; means for moving said presser feet down upon said member to clamp the ribbon thereupon; means for separating said presser feet to longitudinally stretch the clamped portion of said ribbon; devices for cutting said ribbon portion free from the strip; and mechanism for folding said blank to form a clip for the cut ribbon portion.

23. A machine for the described purpose comprising means for receiving and holding a ribbon having clip blanks at its ends; the end portions of said ribbon upon said holding means; and associated mechanism for folding the ends of said ribbon over the ends of said clamping members.

24. A machine for the described purpose comprising means for receiving and holding a ribbon having a clip blank at its ends; clamping members for pressing the end portions of said ribbon upon said holding means; and associated mechanism for folding the clip blanks and the ends of the ribbon over the ends of said clamping members to form clips for said ribbon.

25. A machine for the described purpose comprising means for receiving and holding a ribbon having a gummed clip blank at its end; devices for moistening the exposed gummed surfaces of said blank; and associated mechanism for holding the gummed portions of said blank to form a clip for the ribbon end.

26. A machine for the described purpose comprising a carriage for receiving and holding a ribbon having a gummed clip blank at its end; devices for moistening and folding the gummed portions of said blank to form a clip for the ribbon end; and means for moving said carriage to effect such moistening and folding.

27. A machine for the described purpose comprising means for receiving and holding a ribbon having a laterally projecting flap near its end; and associated mechanism for folding the end portion of the ribbon on a line at an angle to its longitudinal axis and for folding said flap on a line parallel with said axis to form a clip for the ribbon end.

28. A machine for the described purpose comprising means for receiving and holding a ribbon having a laterally projecting flap near its end; means for folding the end portion of the ribbon on a line at an angle to its longitudinal axis; and associated means for folding said flap over the folded end portion of the ribbon to form a clip therefor.

29. A machine for the described purpose comprising means for receiving and holding a ribbon having a flap projecting laterally from each side near its end; means for folding one of said flaps and the end portion of the ribbon upon a line at an angle to its longitudinal axis; and associated means for folding the other flap over the first folded flap to form a clip for the ribbon end.

30. A machine for the described purpose comprising means for receiving and holding a ribbon having a projecting gummed flap; devices for moistening the gummed surface of said flap; and associated mechanism for folding said flap and pressing it to cause it to adhere to the body of the ribbon to form a clip therefor.

31. A machine for the described purpose comprising a member for receiving a ribbon; a pair of presser feet positioned above said member; means for moving said presser feet down upon said member to clamp the ribbon thereupon; means for separating said presser feet to longitudinally stretch the clamped ribbon; and associated mechanism for folding the ends of the stretched ribbon to form clips therefor.

32. A machine for the described purpose comprising a member for receiving a ribbon; means for stretching said ribbon and clamping the stretched ribbon upon said member; and associated mechanism for folding the ends of the clamped ribbon to form clips therefor.

33. A machine for the described purpose comprising a grooved member for receiving a ribbon having a body portion and a projecting flap, the groove of said member being adapted to receive only the body portion of said ribbon; means for pressing said body portion into said groove, thereby elevating said flap; and devices for engaging the elevated flap and folding the same to form a clip for the ribbon.

34. A machine for the described purpose comprising a carriage for receiving and holding a ribbon having a flap projecting from each of its edges; a stationary member adapted to engage and fold one of said flaps; a movable member adapted to engage and fold the other flap; and means for moving said carriage to carry the ribbon into the sphere of action of said folding members.

35. A machine for the described purpose comprising means for receiving and holding a flat ribbon having a body portion and a flap projecting from each edge; and mechanism for holding one of said flaps over said body portion and for folding the other flap over the first folded flap, to form a clip for the ribbon.

36. A machine for the described purpose comprising means for automatically feeding a clip strip and a ribbon strip, by longitudinal movement, into registering relation; means for successively stamping clip blanks from said clip strip and securing them at intervals upon said ribbon strip; means for forming said ribbon strip into sections by cutting it in the regions of said blanks; and associated mechanism for folding said blanks to form clips for the cut ribbon section.

37. A machine for the described purpose comprising means for automatically feeding a clip strip and a ribbon strip, by longitudinal movement, into registering relation; means for successively stamping clip blanks from said clip strip and securing them at intervals upon said ribbon strip; means for forming said ribbon strip into sections by cutting it at said blanks, there being a portion of each blank left upon each end of each section; and associated mechanism for folding the blank portions and the ends of the ribbon section, subsequent to the cutting operation, to form clips for the ends of said section.

38. A machine for the described purpose comprising means for forming a flat clip blank having a body portion and oppositely disposed flaps projecting from its edges; devices for securing the body portion of said blank to a flat ribbon, said flaps projecting beyond the edges of said ribbon; and associated mechanism for folding one of said flaps over said ribbon and for folding an opposite flap over the first folded flap to form a clip for the ribbon.

39. A machine for the described purpose comprising means for forming a clip blank and securing the same to a ribbon; a punch for making a hole through said blank; and associated mechanism for folding the blank on a line intersecting said hole to form a clip with a notched edge.

40. A machine for the described purpose comprising punching means for forming a hole in a ribbon; and associated mechanism for folding said ribbon upon itself on a line intersecting said hole to form a clip having a notched edge.

41. A machine for the described purpose comprising means for automatically feeding a clip strip and a ribbon strip by longitudinal movement into registering relation; means for successively stamping from said clip strip clip blanks and pressing them at intervals upon said ribbon strip; and associated mechanism for folding said clip blanks to form clips upon the ribbon strip.

42. A machine for the described purpose comprising means for separately feeding a gummed clip strip and a ribbon strip in registering relation; means for moistening the surface of said ribbon strip; means for stamping from the clip strip a clip blank and pressing its gummed surface to adhering contact with the moistened ribbon strip; and associated mechanism for folding said clip blank to form a clip for the ribbon.

43. A machine for the described purpose comprising means for separately feeding a clip strip and a ribbon strip in registering relation, one of said strips being gummed; means for stamping from the clip strip a clip blank and pressing it upon the ribbon strip; means for supplying moisture to the adjacent surfaces of said blank and said ribbon strip to cause them to adhere to each other; and associated mechanism for folding said clip blank to form a clip for the ribbon.

In testimony whereof I have signed my name to this specification.

HUBERT McL. ARMISTEAD.

Certificate of Correction.

It is hereby certified that in Letters Patent No. 1,523,625, granted January 20, 1925, upon the application of Hubert McL. Armistead, of San Francisco, California, for an improvement in "Machines for Making and Attaching Typewriter-Ribbon Clips," an error appears in the printed specification requiring correction as follows: Page 9, line 76, claim 23, strike out the words " having clip blanks at its ends " and insert instead the semicolon and words ; *clamping members for pressing;* and that the said Letters Patent should be read with this correction therein that the same may conform to the record of the case in the Patent Office.

Signed and sealed this 21st day of July, A. D. 1925.

[SEAL.]
KARL FENNING,
*Acting Commissioner of Patents.*